United States Patent Office 2,850,490
Patented Sept. 2, 1958

2,850,490

VULCANIZABLE AND VULCANIZED PRODUCTS FROM POLYETHYLENE AND PROCESS FOR THEIR PRODUCTION

Peter J. Canterino and Albert N. De Vault, Bartlesville, Okla., assignors to Phillips Petroleum Company, a corporation of Delaware No Drawing. Application July 12, 1954
Serial No. 442,892

13 Claims. (Cl. 260—94.9)

This invention relates to the halogenation and dehalogenation of hydrocarbon polymers. In one aspect it relates to a process for producing a vulcanizable polymeric material. In another aspect it relates to a novel vulcanized composition.

It is known in the art to produce solid polymers of ethylene and other olefins by polymerization of ethylene or other olefins at very high pressure in the presence of an oxygen-containing catalyst. It is also known in the art to halogenate and to dehalogenate such solid polymers, the halogenation and the dehalogenation being conducted as separate steps. Recently, it has been found that solid polymers of ethylene and other olefins can be produced at relatively low pressures by polymerizing ethylene or other olefins in the presence of a catalyst comprising chromium oxide, usually associated with another oxide. This process and the products thereof are described in the copending application of J. P. Hogan and R. L. Banks, Serial No. 333,576, filed January 27, 1953, now abandoned.

This invention provides a novel and improved process for halogenating and dehalogenating a polymer of an olefin to obtain a partially dehalogenated material which can be vulcanized to produce a novel composition. The vulcanized composition has many uses, some of which are specifically described herein.

According to this invention, there is provided a process whereby a polymer of an aliphatic olefin, e. g. ethylene, can be halogenated and at least partially dehalogenated in substantially a single step and in a single reaction zone to produce a vulcanizable product. The process is conducted by reacting the polymer, at a temperature above its melting point, with a halogenating agent under such conditions that halogenation and partial dehalogenation occur substantially simultaneously. This result is effected by conducting the reaction between the polymer and the halogenating agent at a temperature in the range 150–300° C., preferably 175–275° C. When the reaction is begun at a temperature in the lower part of the broad range of temperature, e. g. 150–175° C., it is preferred to raise the temperature to a value in the range 175–300° C. after substantial halogenation has occurred. It is often preferred to conduct the reaction in the range 175–300° C., in which range halogenation and at least partial dehalogenation occur without further adjustment of the temperature. The halogenation-dehalogenation reaction can be conducted in the presence of a dehydrohalogenation catalyst such as metallic magnesium, metallic zinc, magnesium chloride, zinc chloride or barium chloride. However, the reaction proceeds satisfactorily in the absence of a catalyst and it is, therefore, often preferred to conduct the reaction without a catalyst. The reaction can be conducted in the presence of a halogenation catalyst of the type known in the art or the reactants can be irradiated as, for example, with sunlight or ultraviolet light. It is ordinarily preferred to use irradiation because this manner of operation introduces no foreign materials into the reaction mixture. Alternatively, the reaction can be conducted in the absence of a halogenation catalyst. Although dehydrohalogenation appears to constitute a substantial part of the dehalogenation, the invention is not limited to such a reaction mechanism.

As the halogenating agent, an elemental halogen of the group chlorine, bromine, or iodine or a compound which yields these elements under the reaction conditions can be used. Examples of such halogen-yielding compounds or halogenating agents are carbon tetrachloride, carbon tetrabromide, carbon tetraiodide, hexachloroethane, chloroform, iodoform, bromoform, and phosgene.

The preferred polymer used as the starting material can be any normally solid or tacky polymer of an aliphatic olefin and ordinarily will be a normally solid polymer of a monoolefin such as ethylene, such polymers being produceable as previously described herein. The term "normally solid polymer of ethylene," as used herein, contemplates both homopolymers and copolymers of ethylene, such as copolymers of ethylene with propylene. Although a preferred polymer is a normally solid polymer of ethylene, viscous or semisolid polymers of olefins as disclosed in the cited application of Hogan and Banks can be used. Normally solid polymers of propylene, 1-butene, 1-pentene, or 1-hexene can also be used. A preferred type of polymer is one produced by polymerizing an aliphatic 1-olefin having a maximum chain length of 8 carbon atoms and no chain branching nearer the double bond than the 4-position in the presence of a chromium oxide polymerization catalyst as more fully disclosed in the cited application of Hogan and Banks.

Further, according to this invention, the product of the halogenation and partial dehalogenation can be vulcanized to produce novel materials which have a wide variety of uses. Thus, the vulcanized materials can be molded to form shaped articles, extruded to form pipes or tubes, extruded onto wire to form insulation therefor, or applied to various surfaces as coating materials or heat insulators. Also, in accordance with the invention, a pigment can be added to the recipe, prior to vulcanization, and in such a case a composition is obtained which, after vulcanization, is useful as a marking composition, useful, for example, in crayons, pencils and similar instruments. Suitable pigments which can be incorporated into the composition are carbon black, graphite, titanium dioxide, malachite and iron oxide. Other pigments known in the art can also be used to obtain the color desired. The amount of pigment added is generally within the range of 5 to 75 parts by weight per 100 parts by weight of the halogenated and partially dehalogenated polymer although larger or smaller quantities can be employed. A preferred range is 25 to 60 parts of pigment, and a more preferred range is from 40 to 60 parts. It will be understood by those skilled in the art that the optimum proportion of pigment will depend upon, among other things, the nature of the specific pigment used.

The term "vulcanization" as used herein is intended in the same general sense as that term is used in the rubber or elastomer art. Thus, the vulcanization ordinarily comprises heating the halogenated and partially dehalogenated polymer, for example at a temperature in the range 350–400° F., with a vulcanizing agent such as elemental sulfur, zinc oxide, magnesium oxide, or other known vulcanizing agent such as a suitable organic sulfur compound. Sulfur is the vulcanizing agent which is most widely used.

Vulcanized products ranging from flexible, leathery substances to hard plastics are obtained from solid polyethylene, according to this invention, by first treating the polymer with a halogen such as chlorine, bromine, or iodine or a halogenated hydrocarbon such as carbon tetrachloride or hexachloroethane at an elevated temperature to obtain an unsaturated polymeric material which is then mixed with a vulcanizing agent, and such other compounding ingredients as desired, and vulcanized.

When treated in accordance with one manner of practicing this invention, a solid ethylene polymer is first melted, the temperature is adjusted to the desired level, e. g. 175–300° C., and the halogen or halogenated hydrocarbon is introduced while the reaction mixture is stirred to facilitate contact of the halogen with the polymer. While the scope of the invention is not dependent upon any particular reaction mechanism, it is believed that halogenation of the polyethylene first occurs, followed by dehydrohalogenation. The halogenating agent can be introduced throughout the entire reaction period or the addition of halogenating agent can be stopped and heating continued to effect further dehydrohalogenation. The type of product can be controlled by the amount of halogen introduced, the length of the heating period, if any, which follows, and the temperature. The reaction time will usually range from 1 to 30 hours but can be longer or shorter. The unsaturated polymer thus obtained is then mixed with a vulcanizing agent and such other compounding ingredients as desired such as activators, accelerators, fillers, etc., and the compounded stock is then vulcanized.

The production of the unsaturated polymers is effected essentially in one step, the only agent added being a halogen or a halogenated hydrocarbon, such as carbon tetrachloride or hexachloroethane. It is not necessary that a halogenation step be effected first in the presence of a solvent or dispersing medium followed by a separate dehydrohalogenation step in which a dehydrohalogenating agent is employed. By merely controlling the reaction conditions, a vulcanizable material is readily obtained in a single step.

Instead of operating at a high temperature throughout the reaction period, i. e., 175–300° C., it is sometimes preferred to use a lower temperature during the addition of the halogen or halogenated compound (carbon tetrachloride or hexachloroethane) and then to raise the temperature toward the end of the reaction period. For example, the halogen can be introduced into the melted polyethylene at a temperature below 175° C. and the temperature then raised and maintained at the higher level for the desired period.

The halogen or halogenated compound can be added over a period of from 1 to 10 hours and the mixture then heated, if desired, for a period up to 20 hours or longer. During the heating period, it is frequently preferred to flush the reactor with an inert gas such as carbon dioxide or nitrogen to purge the system of hydrogen halide which has been formed during the reaction. During the entire reaction period, i. e., during the addition of halogen and also during the heating period, the reaction mixture is stirred or otherwise agitated.

When chlorine, carbon tetrachloride, or hexachloroethane is employed, the amount preferred is generally in the range from 8 to 60 parts by weight per 100 parts polyethylene although larger quantities can be added if desired. With other halogens, corresponding amounts, based on the equivalent weights, are used. While the products frequently contain halogen, it is generally considered desirable, if the halogen is chlorine, that the halogen content not exceed 10 percent by weight and preferably that it be less than 7 percent by weight. A suitable range of chemically bound chlorine content is from 2 to 7 weight percent. Corresponding amounts of the other halogens can be present instead of chlorine.

This invention provides a method for obtaining polymeric materials ranging in unsaturation from 2 to 15 percent or higher (2 to 15 double bonds per 100 ethylene units in the polymer) from polyethylene. It is believed that these unsaturated materials are free from cross linkages, i. e., the halogenation and dehydrohalogenation occur in the same polymer chain. These materials, when compounded and vulcanized, yield valuable products which range from flexible leathery substances to hard plastics, depending on the details of the method of preparation. The vulcanized products are much more solvent resistant than the polyethylene from which they were prepared and are also resistant to the action of acids and alkalies. The unvulcanized products have little strength and cannot be molded satisfactorily, while the vulcanized materials can be employed in the manufacture of various molded articles and can be extruded into pipe or onto wire as insulation. They can also be used as coating materials.

Example 1

Ethylene was polymerized, over a chromium oxide-silica-alumina catalyst containing 2.4 weight percent chromium as chromium oxide operating at 320° F. and a pressure of 400 p. s. i. g., a space velocity (volumes liquid/volume reactor/hour) of 6, and a feed containing 3 weight percent ethylene is isooctane. The ethylene feed rate was 1.3 pounds/hour and the isooctane flow rate was 11 gallons/hour. The polyethylene obtained was insoluble in benzene and acetone. It had a molecular weight of 13,640.

One hundred fifty grams of the polyethylene described above was charged to a reactor provided with a stirrer and a Dry-Ice condenser. The polyethylene was melted, the temperature was adjusted to 160° C., and 66 grams of chlorine was introduced over a period of approximately four hours while the reaction mixture was stirred and irradiated with ultraviolet light. The temperature was maintained at 150–170° C. After introduction of the chlorine, stirring was continued and the mixture was heated to 250° C., over an 8-hour period to complete the dehydrochlorination. The reactor was flushed with carbon dioxide during the heating period to purge the system of HCl which was formed during the reaction. The product had a chlorine content of 5.05 weight percent and an unsaturation of 6.9 percent (an average of 6.9 double bonds per 100 ethylene units). Unsaturation was determined by the iodine monochloride titration method.

The unsaturated product was compounded in accordance with the following recipes:

| | Parts by Weight | |
|---|---|---|
| | I | II |
| Unsaturated product from polyethylene chlorination and dechlorination | 100 | 100 |
| Stearic acid | 2 | 2 |
| Sulfur | 2 | 2 |
| Zinc oxide | 5 | 5 |
| Agerite Alba (hydroquinone monobenzyl ether) | 1 | 1 |
| N,N-dimethyl-S-tert-butylsulfenyl dithiocarbamate | 1.5 | 1.5 |
| Carbon black (SAF black) | | 50 |

The mixtures were milled on a hot mill and vulcanized by heating at 300° F. for 45 minutes. The samples were tested on an Instron tester using 0.2 inch cross-head speed. The following results were obtained:

| Sample No. | Tensile, p. s. i. | Elongation, percent | Description of Product |
|---|---|---|---|
| I | 1,090 | 92 | Flexible, leathery product, insoluble in toluene. |
| II | 1,065 | 4.5 | Hard, somewhat brittle product, insoluble in toluene. |

For control purposes an uncompounded sample of the unsaturated product was heated under the same conditions used for vulcanization of the compounded samples. A hard, crumbly material, soluble in toluene, was obtained. It could not be removed from the mold without breaking.

The vulcanized material containing carbon black (recipe II) marks on paper in much the same manner as an ordinary pencil. The marks do not smear and are easily erasable. Thus, it is evident that the vulcanized product of this invention can be used as a binder for graphite in the manufacture of pencils. Other types of carbon black, such as channel black, lamp black, acetylene black, high-abrasion furnace black, and the like, can be used as pigments. This type of product can be fabricated into leads for mechanical pencils.

*Example II*

A sample of polyethylene (400 grams) prepared as described in Example I, and having a molecular weight of 10,050 was charged to a reactor provided with a stirrer and a Dry-Ice condenser. The polyethylene was melted, the temperature was adjusted to 160° C., and 120 grams of chlorine was introduced over a period of approximately six hours. During the addition of the chlorine the temperature ranged from 150–170° C. The mixture was stirred throughout this period, and irradiated with ultraviolet light. Stirring was continued while the temperature was raised to 240–250° C. and the reactor was flushed with carbon dioxide as in Example I. The product has an unsaturation of 11.6 percent, as determined by the iodine monochloride titration method, and contained 3.88 weight percent chlorine.

A portion of the product was compounded in accordance with the following recipe:

| | Parts by weight |
|---|---|
| Polymer | 100 |
| Stearic acid | 2 |
| Sulfur | 2 |
| Agerite alba (hydroquinone monobenzyl ether) | 1 |
| N,N-dimethyl-S-tert-butylsulfenyl dithiocarbamate | 1.5 |
| Zinc oxide | 5 |

The sample was cured 45 minutes at 307° F., and physical properties were determined. Physical properties were also determined on a sample of chlorine-treated but uncompounded polyethylene and on the original polyethylene. The following results were obtained:

| | Compounded and Vulcanized Sample | Uncompounded Sample | Original Polyethylene |
|---|---|---|---|
| Percent unsaturation | 11.6 | 11.6 | 0. |
| Percent chlorine | 3.88 | 3.88 | 0. |
| Compounded and vulcanized | Yes | No | No. |
| Tensile, p. s. i. | 1,195 | 1,270 | 2,060. |
| Elongation, percent | 45 | 15 | 10. |
| Softening point, °F | [1] >260 | 222 | 250. |
| Flex temperature, °F | −38 | −96 | Brittle. |
| Electrical properties: | | | |
| 1 kc.[2]— | | | |
| Dissipation factor | 0.0032 | 0.0031 | <0.0005. |
| Dielectric constant | 2.94 | 2.64 | 2.35. |
| 1 mc.[3]— | | | |
| Dissipation factor | 0.0170 | 0.0100 | <0.0005 |
| Dielectric constant | 2.75 | 2.56 | 2.32. |
| Vol. percent swell in toluene: | | | |
| At 78° F | 37.2 | Disintegrated | Partially soluble. |
| At 212° F., 24 Hr | 124 | Dissolved | |

[1] Rubbery product; does not lose its shape at 260° F.
[2] Kilocycle.
[3] Megacycle.

The foregoing data show that a rubbery material having desirable electrical insulation properties and low solubility in toluene is prepared according to this invention.

*Example III*

A sample of commercial polyethylene [1] (400 grams) having a molecular weight of 11,500 was melted, the temperature was adjusted to 160° C. and 96 grams of chlorine was introduced over a 6-hour period while the mixture was stirred and irradiated with ultraviolet light. The procedure was similar to that described in the preceding examples. During chlorination, the reaction mixture became very viscous. After addition of the chlorine, the mixture was heated to 240–250° C. and stirred while the reactor was flushed with carbon dioxide. The product had an unsaturation of 6.05 percent as determined by the iodine monochloride titration method, and contained 5.6 weight percent chlorine.

A portion of the product was compounded using the recipe given in Example II. The sample was cured 45 minutes at 307° F., and physical properties were determined. Physical properties were also determined on the treated but uncompounded product and on the original polyethylene. The following results were obtained:

| | Compounded and Vulcanized Sample | Uncompounded Sample | Original Polyethylene |
|---|---|---|---|
| Percent unsaturation | 6.05 | 6.05 | 0. |
| Percent chlorine | 5.6 | 5.6 | 0. |
| Compounded and vulcanized | Yes | No | No. |
| Tensile, p. s. i. | 595 | 495 | 830. |
| Elongation, percent | 70 | 170 | 73. |
| Softening point, °F | 180 | 180 | 212. |
| Flex temperature, °F | −52 | −60 | −40. |
| Electrical properties: | | | |
| 1 kc.[1]— | | | |
| Dissipation factor | 0.0029 | 0.0034 | <0.0005. |
| Dielectric constant | 3.05 | 2.86 | 2.3. |
| 1 mc.[1]— | | | |
| Dissipation factor | 0.0268 | 0.0189 | <0.0005. |
| Dielectric constant | 2.79 | 2.69 | 2.3. |
| Vol. percent swell in toluene at 78° F. | 115.5 | Disintegrated | Soluble. |

[1] As in Example II.

The foregoing data show that useful products are obtained, according to this invention, from polyethylene other than those produced by polymerizing ethylene in the presence of a chromium oxide catalyst.

*Example IV*

Polyethylene was prepared in a manner similar to that described in Example I to give a product having a molecular weigh of 9,000. To 130 grams of this material heated to 200° C., 30 grams of chlorine was introduced over a two-hour period while the mixture was stirred. The temperature increased to 230° C. and was maintained at this level during the reaction. The product contained 5.1 weight percent chlorine and had an unsaturation of 4 percent as determined by the iodine monochloride titration method. This product can be vulcanized according to the procedure in the foregoing examples.

*Example V*

Ten milliliters (16 grams) of carbon tetrachloride was added to 150 grams of the polyethylene described in Example IV and the mixture was heated to 180° C. At the end of this period, more carbon tetrachloride was introduced over a period of six hours until a total of 17 ml. (27 grams) had been added. Toward the end of the reaction the temperature increased to 210° C. The mixture was stirred throughout the reaction period. The product contained 2.8 weight percent chlorine and had an unsaturation of 5.2 percent as determined by the iodine monochloride titration method. This product can be vulcanized as previously described.

*Example VI*

One hundred fifty grams of polyethylene prepared as described in Example IV was heated to 190° C., and 60 grams of bromine was added dropwise over a period of four hours while the reaction mixture was stirred. The temperature was maintained at 190–210° C. throughout the reaction period. Heating and stirring were continued for 0.5 hour after addition of the bromine. The product contained 2.8 weight percent bromine and had an

[1] Presumably prepared by polymerization in the presence of an organic peroxide-type catalyst at a pressure of the order of 5000–10,000 p. s. i.

unsaturation of 3.6 percent as determined by the iodine monochloride titration method. Infrared analysis on a sample which had been purified by crystallization from methylcyclohexane showed the product to be unsaturated. This product can be vulcanized as previously described.

The vulcanizable products of this invention generally contain from about 1 to about 10 weight percent, and frequently from 2 to 7 weight percent, chemically combined halogen, and have an unsaturation in the range 2 to 15 percent (average number of double bonds per monomer unit) and frequently 3 to 12 percent. However it is within the scope of the invention to effect substantially complete halogen removal especially where bromination and/or iodination agents are used.

The molecular weights mentioned herein are determined by the methods of Kemp and Peters, Ind. Eng. Chem. 35, 1108 (1943), and Dienes and Klemm, J. App. Phys. 17, 458–471 (June 1946).

The molecular weights were calculated according to the equation $$M = \frac{4.03 \times 10^3 \times N_i \times 14}{1.303}$$

wherein M is the molecular weight and $N_i$ is the intrinsic viscosity as determined for a solution of 0.2 gm. of polymer in 50 cc. of tetralin at 130° C.

While certain examples, process steps and compositions have been disclosed for purposes of illustration, the invention is clearly not limited thereto. The essence of the invention is that there is provided a process for the substantially simultaneous halogenation and partial dehalogenation of a polymer of an aliphatic olefin and that the process produces a vulcanizable composition, which, when vulcanized, yields a useful and novel vulcanizate. It will be evident to those skilled in the art that variation and modification within the scope of the disclosure and the claims can be practiced.

The foregoing examples and discussion relate primarily to batch-type operation. It should be understood that the same reactions can be carried out in a continuous manner, using suitable equipment, as will be evident, to those skilled in the art, from this disclosure.

We claim:

1. A process which comprises reacting a normally solid polymer of an aliphatic olefin with a halogenating agent at a temperature in the range of 150° C. to 300° C. for a period of 1 to 30 hours, effecting halogenation and at least partial dehalogenation with removal of hydrogen halide in substantially a single step, the dehalogenation being effected at a temperature of at least 175° C. and within said range, regulating reaction conditions of temperature and time to provide a product having an unsaturation of from 2 to 15 percent and a combined halogen content not exceeding 10 percent by weight and recovering the resulting halogenated product.

2. The process of claim 1 in which the halogenation and dehalogenation are carried out in the temperature range of 175° C. to 300° C.

3. The process of claim 1 in which the normally solid polymer is a polymer of ethylene and the halogenating agent is selected from the group consisting of chlorine, bromine, iodine, and materials capable of yielding these halogens.

4. The process of claim 3 in which the halogenating agent is elemental chlorine.

5. The process of claim 3 in which the halogenating agent is added over a period in the range of 1 to 10 hours and heating is continued for an additional period up to 20 hours after introduction of the halognating agent has ceased.

6. The process according to claim 5 wherein said halogenating agent is elemental chlorine.

7. The process according to claim 5 wherein said halogenating agent is elemental bromine.

8. The process according to claim 5 wherein said halogenating agent is elemental iodine.

9. The process according to claim 5 wherein said halogenating agent is carbon tetrachoride.

10. The process according to claim 5 wherein said halogenating agent is hexachloroethane.

11. A writing instrument comprising, as the marking element thereof, a vulcanizate of halogenated polymer prepared according to the process of claim 1 containing from 5 to 75 parts by weight of a pigment selected from the group consisting of carbon black, graphite, titanium dioxide, malachite, and iron oxide.

12. A vulcanizable product prepared according to the process of claim 1.

13. A product of the vulcanization of a halogenated material prepared in accordance with the process of claim 1.

References Cited in the file of this patent

UNITED STATES PATENTS

| | | |
|---|---|---|
| 2,261,757 | Fawcett | Nov. 4, 1941 |
| 2,398,803 | Myles | Apr. 23, 1946 |
| 2,416,069 | Scott | Feb. 18, 1947 |
| 2,480,008 | Anderson | Aug. 23, 1949 |

OTHER REFERENCES

Schildknecht: "Vinyl and Related Polymers," page 528, Wiley and Sons, New York (1952).

UNITED STATES PATENT OFFICE
CERTIFICATE OF CORRECTION

Patent No. 2,850,490                                      September 2, 1958

Peter J. Canterino et al.

It is hereby certified that error appears in the printed specification of the above numbered patent requiring correction and that the said Letters Patent should read as corrected below.

Column 2, line 64, for "350-400°" read -- 250-400° --; column 4, line 23, for "ethylene is" read -- ethylene in --; column 7, line 23, in the equation for "1.303" read -- 2.303 --; column 8, line 17, for "halognating" read -- halogenating --.

Signed and sealed this 21st day of April 1959.

(SEAL)
Attest:

KARL H. AXLINE                                    ROBERT C. WATSON
Attesting Officer                                 Commissioner of Patents